(12) United States Patent
Yamasaki et al.

(10) Patent No.: US 11,521,413 B2
(45) Date of Patent: Dec. 6, 2022

(54) INFORMATION PROCESSING APPARATUS, METHOD OF CONTROLLING INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Mari Yamasaki, Tokyo (JP); Takashi Adachi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/699,968

(22) Filed: Dec. 2, 2019

(65) Prior Publication Data

US 2020/0184205 A1 Jun. 11, 2020

(30) Foreign Application Priority Data

Dec. 5, 2018 (JP) .............................. JP2018-228322

(51) Int. Cl.
*G06V 40/10* (2022.01)
*G06V 10/25* (2022.01)
(Continued)

(52) U.S. Cl.
CPC ............ *G06V 40/103* (2022.01); *G06V 10/25* (2022.01); *G06V 20/46* (2022.01); *G06V 20/52* (2022.01)

(58) Field of Classification Search
CPC ........... G06K 9/00369; G06K 9/00744; G06K 9/00771; G06K 9/3233
(Continued)

(56) References Cited

U.S. PATENT DOCUMENTS 9,794,463 B2 10/2017 Adachi
10,104,279 B2 10/2018 Adachi
(Continued)

FOREIGN PATENT DOCUMENTS

EP 2109076 A1 10/2009
GB 2436904 A 10/2007
(Continued)

OTHER PUBLICATIONS

Extended European Search Report issued by the European Patent Office dated Apr. 2, 2020 in corresponding European Patent Application No. 19209916.6.

*Primary Examiner* — Wednel Cadeau
(74) *Attorney, Agent, or Firm* — Carter, DeLuca & Farrell LLP

(57) ABSTRACT

An information processing apparatus comprising a setting unit configured to set a plurality of areas for detecting an object in a moving image, a detection unit configured to analyze the moving image and detect an object, a determination unit configured to determine a stay time for which the object has stayed within the area on the basis of a result of detecting the object in the moving image, a specifying unit configured to, when the same object has been detected in a plurality of the areas by the detection unit, specify an area, among the plurality of areas, to be associated with the stay time, on the basis of a predetermined condition, and an output unit configured to output information in which the area specified by the specifying unit and the stay time are associated with each other.

6 Claims, 11 Drawing Sheets

(51) Int. Cl.
*G06V 20/40* (2022.01)
*G06V 20/52* (2022.01)

(58) Field of Classification Search
USPC .......................................................... 382/103
See application file for complete search history.

(56) References Cited

U.S. PATENT DOCUMENTS

| 2007/0248244 | A1* | 10/2007 | Sato ........................ | G06F 16/58 |
| | | | | 707/E17.026 |
| 2009/0164284 | A1* | 6/2009 | Koiso .................... | G06Q 10/00 |
| | | | | 705/7.29 |
| 2016/0275356 | A1* | 9/2016 | Kuwahara ............ | G06V 40/172 |

FOREIGN PATENT DOCUMENTS

| GB | 2535091 A | 8/2016 |
| JP | 2015069279 A | 4/2015 |
| JP | 2015069639 A | 4/2015 |
| JP | 2017182654 A | 10/2017 |
| WO | 2017169189 A1 | 10/2017 |

\* cited by examiner

F I G. 5

| STAY START TIME 501 | STAY END TIME 502 | TRACKING ID 503 | STAY TIME FOR AREA 1 504 | STAY TIME FOR AREA 2 505 | STAY TIME FOR AREA 3 506 |
|---|---|---|---|---|---|
| 2018/11/06 16:00:00 | 2018/11/06 16:03:00 | 4 | 00:03:00 | 0 | 0 |
| 2018/11/06 16:01:30 | 2018/11/06 16:08:00 | 2 | 0 | 00:06:30 | 0 |
| 2018/11/06 16:01:00 | 2018/11/06 16:12:00 | 1 | 0 | 0 | 00:11:00 |
| 2018/11/06 16:03:20 | 2018/11/06 16:13:20 | 5 | 00:10:00 | 0 | 0 |

| STAY START TIME | STAY END TIME | TRACKING ID | STAY TIME FOR AREA A | STAY TIME FOR AREA B |
|---|---|---|---|---|
| 2018/11/06 16:00:00 | 2018/11/06 16:04:00 | 15 | 00:04:00 | |
| 2018/11/06 16:04:05 | 2018/11/06 16:04:15 | 15 | 0 | 00:00:10 |
| 2018/11/06 16:04:20 | 2018/11/06 16:06:40 | 15 | 00:02:20 | |

| TRACKING ID | CUMULATIVE STAY TIME FOR AREA A | CUMULATIVE STAY TIME FOR AREA B | CUMULATIVE STAY TIME FOR OUTSIDE AREAS |
|---|---|---|---|
| 15 | 00:06:20 | 00:00:10 | 00:00:10 |

| STAY START TIME | STAY END TIME | TRACKING ID | STAY TIME FOR AREA A | STAY TIME FOR AREA B |
|---|---|---|---|---|
| 2018/11/06 16:00:00 | 2018/11/06 16:06:40 | 15 | 00:06:40 | 0 |

| STAY START TIME | STAY END TIME | TRACKING ID | STAY TIME FOR OUTSIDE AREA | STAY TIME FOR AREA A |
|---|---|---|---|---|
| 2018/11/06 16:00:00 | 2018/11/06 16:00:30 | 15 | 0 | 00:00:30 |
| 2018/11/06 16:00:30 | 2018/11/06 16:00:40 | 15 | 00:00:10 | 0 |
| 2018/11/06 16:00:40 | 2018/11/06 16:05:00 | 15 | 0 | 00:04:20 |

| STAY START TIME | STAY END TIME | TRACKING ID | STAY TIME FOR OUTSIDE AREA | STAY TIME FOR AREA A |
|---|---|---|---|---|
| 2018/11/06 16:00:00 | 2018/11/06 16:05:00 | 15 | 0 | 00:05:00 |

INFORMATION PROCESSING APPARATUS, METHOD OF CONTROLLING INFORMATION PROCESSING APPARATUS, AND NON-TRANSITORY COMPUTER-READABLE STORAGE MEDIUM

BACKGROUND OF THE INVENTION

Field of the Invention

The present disclosure relates to an information processing apparatus, a method of controlling an information processing apparatus, and a non-transitory computer readable storage medium.

Description of the Related Art

Images shot by surveillance cameras, images stored in storage devices after being shot, and the like are increasingly being analyzed and utilized. For example, human body detection and human body tracking techniques can be used to count the number of people in an area, the number of people who have crossed a line, and so on. This makes it possible to understand the state of the activities of people in a specific area, and in particular the amount of time for which the people remain in the specific area. Japanese Patent Laid-Open No. 2015-69639 and Japanese Patent Laid-Open No. 2017-182654 disclose inventions which measure the amount of time a person stays (the stay time) within a specific area.

However, if areas are set for each of predetermined locations where people are helped, such as a single reception desk, and the stay times for which the people stay within the areas are measured, a person may be detected within a plurality of areas. Situations are also conceivable where a person temporarily enters, exits from, or passes through a different area. Such cases require a technique for measuring the stay time as a stay time in a specific areas associated with a reception desk estimated to be used by the person.

SUMMARY OF THE INVENTION

A technique is provided which makes it possible to measure a stay time for which a subject detected within an image is associated with a specific area.

One aspect of exemplary embodiments relates to an information processing apparatus comprising a setting unit configured to set a plurality of areas for detecting an object in a moving image, a detection unit configured to analyze the moving image and detect an object, a determination unit configured to determine a stay time for which the object has stayed within the area on the basis of a result of detecting the object in the moving image, a specifying unit configured to, when the same object has been detected in a plurality of the areas by the detection unit, specify an area, among the plurality of areas, to be associated with the stay time, on the basis of a predetermined condition, and an output unit configured to output information in which the area specified by the specifying unit and the stay time are associated with each other.

Further features of the invention will become apparent from the following description of exemplary embodiments (with reference to the attached drawings).

BRIEF DESCRIPTION OF THE DRAWINGS

FIG. 5 is a diagram illustrating an example of a table in which measurement results are registered, according to an exemplary embodiment.

FIG. 6B is a diagram illustrating an example of a table 610 illustrating an example of measurement results obtained for a human body in a use case 600, according to an exemplary embodiment.

FIG. 6C is a diagram illustrating an example of a table 620 in which stay times having the same tracking IDs 613 have been extracted from the table 610, according to an exemplary embodiment.

FIG. 6D is a diagram illustrating an example of a table 630 showing a single stay-unit obtained by adjusting the stay time on the basis of a selected stay-unit and integrating a plurality of stay-units, according to an exemplary embodiment.

DESCRIPTION OF THE EMBODIMENTS

Figure 1A:
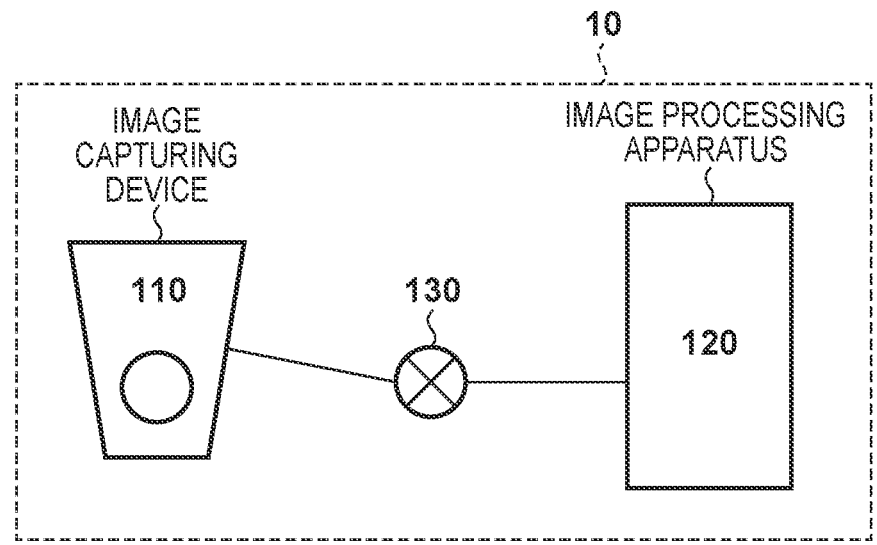
FIG. 1A is a diagram illustrating an example of a system configuration according to an exemplary embodiment.

Exemplary embodiments will be described next with reference to the drawings. It should be noted that the configurations described in the following embodiments are merely examples, and that the invention is not intended to be limited to the configurations described therein and illustrated in the drawings.

First Embodiment

A system configuration according to an exemplary embodiment will be described with reference to FIG. 1A. FIG. 1A is a block diagram illustrating an example of the configuration of an image processing system 10 according to the present embodiment. The image processing system 10 is configured by connecting at least one image capturing device (network camera) 110 with an image processing apparatus 120 over a network 130.

The image capturing device 110 is a surveillance camera installed in a monitored zone such as a store, a theater, a movie theater, or a stadium. The image capturing device 110 is installed so as to shoot a predetermined area in the monitored zone (a monitored area), and has a function for delivering shot images (moving images, still images) to the image processing apparatus 120 over the network 130. A plurality of the image capturing devices 110 may be prepared and installed to shoot a plurality of corresponding monitored areas within the monitored zone.

The image capturing device 110 generates an image by shooting the monitored area within the monitored zone. The image capturing device 110 A/D converts an analog image signal, which has been obtained through photoelectric conversion using an image sensor such as a CCD or a CMOS image sensor, into a digital image signal. The digital image signal is subjected to developing processing such as de-Bayering, white balance processing, tone conversion processing, and the like. The digital image signal output from a development processing unit is furthermore compressed and encoded to generate image data. The image compression method can employ a standard such as H.264, H.265, MJPEG, JPEG, or the like. The image data may furthermore be generated in any desired format, including mp4, avi, or the like. The encoded image data is delivered to the image processing apparatus 120. In addition to still images, the image capturing device 110 can, for example, obtain a predetermined number of frames per second (e.g., 30 frames) of an image to obtain a 30-fps moving image (live video) of the monitored area.

The image processing apparatus 120 can be realized by an information processing apparatus, a communication apparatus, a control apparatus, or the like, such as a personal computer, a server, a tablet, or the like. The image processing apparatus 120 can communicate with the image capturing device 110 over the network 130 and control the operations of the image capturing device 110. For example, requests can be made for changing the shooting direction and image quality settings of the image capturing device 110, carrying out PTZ control, and the like. Moving images and still images captured by the image capturing device 110 can be received over the network 130. Instead of being realized by a single apparatus, the functions of the image processing apparatus 120 may be realized by a plurality of apparatuses operating cooperatively.

The image processing apparatus 120 may send settings for determination areas (described later), image capturing control commands, and the like to the image capturing device 110. The image capturing device 110 sends responses to those commands to the image processing apparatus 120. The image processing apparatus 120 sets determination areas (described later), makes settings pertaining to processing such as determination processing and output processing, and so on for the obtained image information.

The network 130 can be constituted by a Local Area Network (LAN). However, the network 130 is not limited to a LAN, and may be the Internet, a Wide Area Network (WAN), or the like. The physical format of the connection to the network 130 may be a wired connection or a wireless connection. Furthermore, although one each of the image capturing device 110 and the image processing apparatus 120 are connected to the network 130 in FIG. 1A, the number of connected devices is not limited to the number illustrated in FIG. 1A, and more devices may be connected.

Figure 1B:
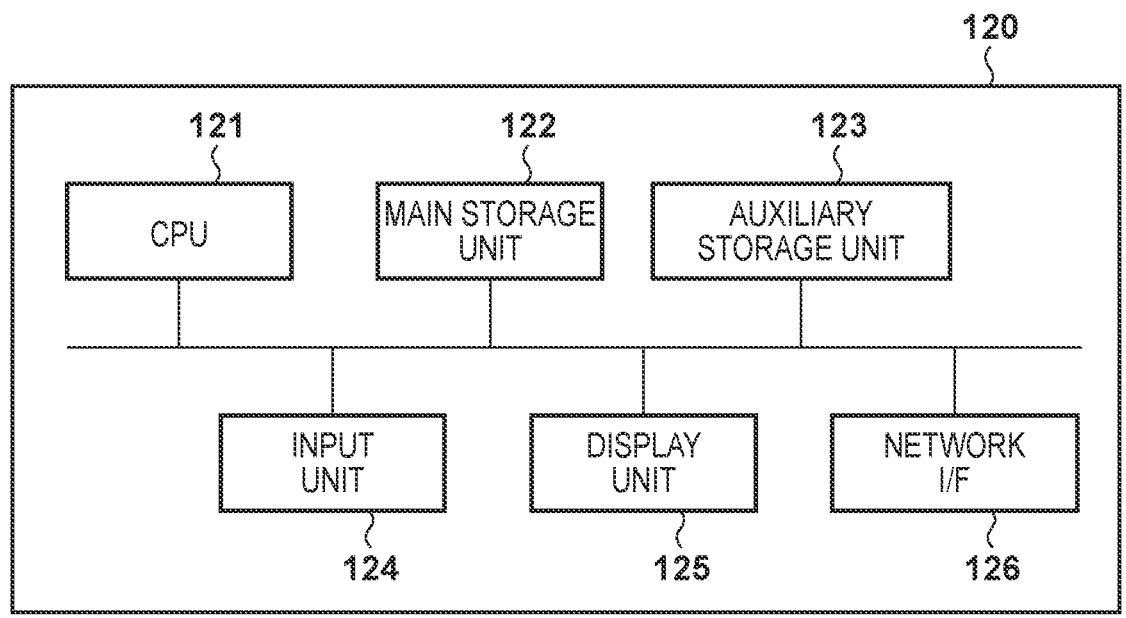
FIG. 1B is a diagram illustrating an example of the hardware configuration of an image processing apparatus according to an exemplary embodiment.

Next, the hardware configuration of the image processing apparatus 120 will be described with reference to FIG. 1B. FIG. 1B is a block diagram illustrating an example of the hardware configuration of the image processing apparatus 120 according to this exemplary embodiment. The configuration illustrated in FIG. 1B is merely an example of the configuration of the image processing apparatus 120, and can be modified or changed as appropriate.

A CPU 121 executes processes using computer programs, data, and the like stored in a main storage unit 122. As a result, the CPU 121 controls the operations of the image processing apparatus 120 as a whole, and executes the various processes carried out by the image processing apparatus 120 (mentioned later). The CPU 121 realizes the functions described later by executing processes using computer programs, data, and the like stored in the main storage unit 122. The main storage unit 122 is a storage device such as Random Access Memory (RAM). The main storage unit 122 has an area for storing computer programs, data, and the like loaded from an auxiliary storage unit 123, various types of data and images received from the image capturing device 110 through a network I/F 126 or obtained from files, and so on. The main storage unit 122 further includes a work area used by the CPU 121 when executing various processes. In this manner, the main storage unit 122 can provide various types of areas as appropriate.

The auxiliary storage unit 123 is a high-capacity information storage device such as a Hard Disk Drive (HDD), Read-Only Memory (ROM), or a Solid State Drive (SSD). An operating system (OS), computer programs for causing the CPU 121 to execute the processes carried out by the image processing apparatus 120 (described later), data, and the like are stored in the auxiliary storage unit 123. Various types of data and captured images received from the image capturing device 110 through a network I/F 126, images obtained from another external device connected to the network 130 (an image server or the like), and so on are also stored in the auxiliary storage unit 123. The computer programs, data, and the like stored in the auxiliary storage unit 123 are loaded into the main storage unit 122 as appropriate under the control of the CPU 121, and are then processed by the CPU 121.

An input unit 124 is constituted by a user interface such as a keyboard, a mouse, a touch panel, or the like, and can input various types of instructions to the image processing apparatus 120 by being operated by a user of the image processing apparatus 120. A display unit 125 is constituted by a liquid crystal screen or the like, and is capable of displaying the results of processes performed by the image processing apparatus 120 as images, graphics, text, or the like. The network I/F 126 is an interface used by the image processing apparatus 120 for data communication with the image capturing device 110 over the network 130.

Although FIG. 1B illustrates the image processing apparatus 120 as a single apparatus including the input unit 124 and the display unit 125, the input unit 124 and the display unit 125 may be provided as units separate from the image processing apparatus 120. Alternatively, the display unit 125 may be integrated with the image processing apparatus 120, and the input unit 124 may be provided separately. Conversely, the input unit 124 may be integrated with the image processing apparatus 120, and the display unit 125 may be provided separately. Furthermore, the input unit 124 and the display unit 125 may be an integrated unit provided separate from the image processing apparatus 120. When the input unit 124 and/or the display unit 125 are units separate from the image processing apparatus 120, the image processing apparatus 120 can further include interface(s) for making connections.

Figure 2:
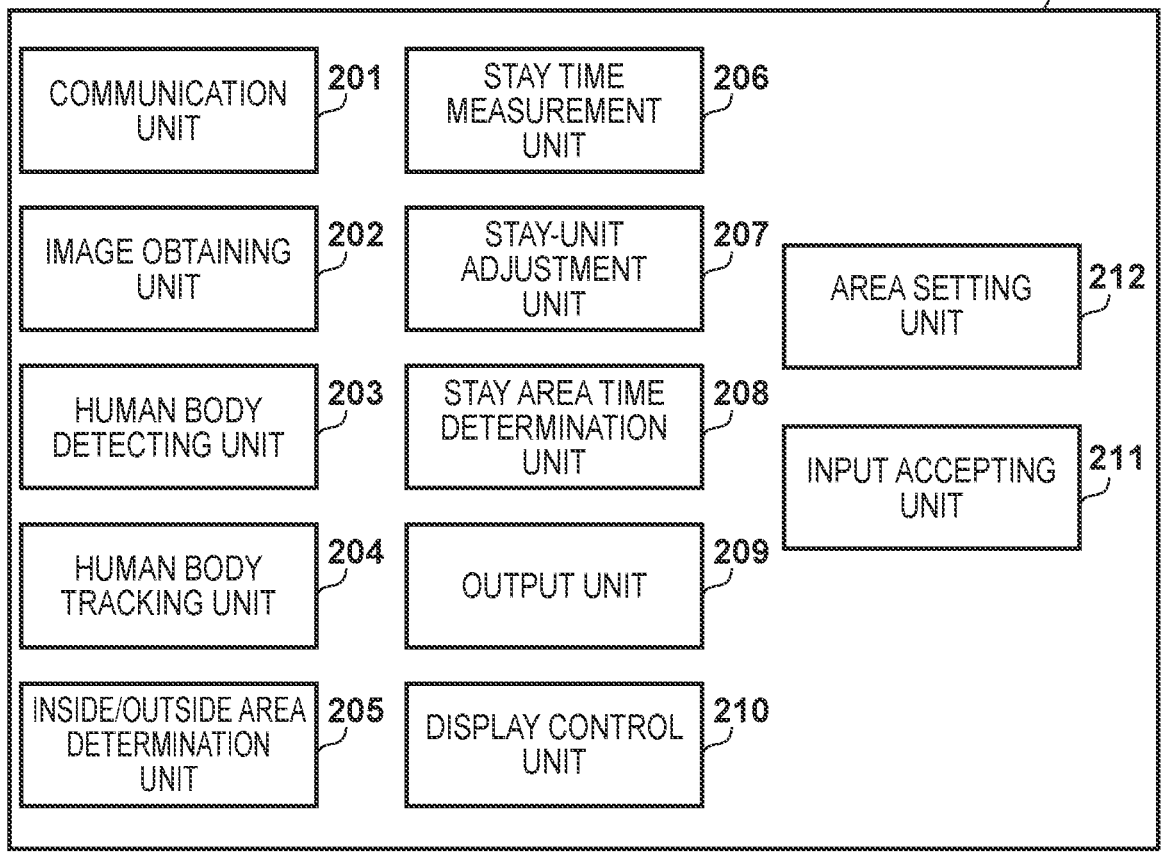
FIG. 2 is a diagram illustrating an example of the functional configuration of an image processing apparatus according to an exemplary embodiment.

The functional configuration of the image processing apparatus 120 corresponding to this exemplary embodiment will be described next with reference to FIG. 2. FIG. 2 is a block diagram illustrating an example of the functional configuration of the image processing apparatus 120 according to this exemplary embodiment. The functions realized by each function block will be described below.

A communication unit 201 communicates with the image capturing device 110 over the network 130. An image obtaining unit 202 obtains an image obtained from the image capturing device 110 through the communication unit 201, or an image stored in the auxiliary storage unit 123, as an image to be processed. The image may be a still image or a moving image. The moving image is constituted by a plurality of frame images that are continuous (or related) with respect to time, and each frame image (also called simply "images" for the sake of simplicity hereinafter) serves as an image to be processed according to the present embodiment. The plurality of images continuous with respect to time may be images obtained by thinning the frame images in a moving image captured by the image capturing device 110. For example, one out of every predetermined number of frame images in a moving image captured by the image capturing device 110 may be obtained and used as the image to be processed.

A human body detecting unit 203 detects a human body (a person), which is an object, present in the image to be processed by analyzing the image. Although the present embodiment describes a situation where the object to be processed is a human body, the object may also include other tangible objects aside from a human body, such as vehicles or the like. A human body tracking unit 204 identifies and tracks the same human body, among the human bodies detected among a plurality of images (frames) that are continuous with respect to time.

An inside/outside area determination unit 205 carries out an inside/outside area determination, in which it is determined whether a given person is present inside an area or is present outside the area, on the basis of position information of the detected human body and position information of a set area. A stay time measurement unit 206 measures a stay time, which is the amount of time a human body has stayed within a set area. The stay time measurement unit 206 holds a stay start time, a stay end time, and the stay time, in association with information identifying the human body and the area, as a "stay-unit" in the auxiliary storage unit 123, for each detected human body.

A stay-unit adjustment unit 207 adjusts the stay-unit generated by the stay time measurement unit 206. In the present embodiment, this process will be called a "stay-unit adjustment process". The stay-unit adjustment process will be described in detail later. A stay area time determination unit 208 determines a determination area in which each detected human body stays on the basis of the adjusted stay-unit, and determines the stay time. An output unit 209 outputs the stay-unit that has been adjusted and determined. A display control unit 210 carries out a process for displaying an image obtained from the image capturing device 110 through the communication unit 201, or an image stored in the auxiliary storage unit 123, in the display unit 125 via the plurality of processing blocks 202 to 212. When displaying an image, the stay time for each person can also be displayed, on the basis of the stay-units. The display control unit 210 can display a GUI for accepting operations from the image processing apparatus 120 in the display unit 125.

An input accepting unit 211 imports signals from the input unit 124. The user operating the image processing apparatus 120 can operate the GUI displayed in the display unit 125 and make inputs through the input unit 124. The user can also make area settings (described later) and so on through the GUI. An area setting unit 212 sets an area within an image and holds area setting information pertaining to the set area. The area setting information of an area that has been set is held until a change is made thereto.

Based on the above-described configuration, the image processing apparatus 120 carries out processes such as image analysis, settings, measurements, outputs, and the like. An overview of the processing executed by the image processing system 10 through the above-described configuration will be described next. First, the image to be processed is analyzed, and the human body serving as the object is detected. If a plurality of human bodies have been detected within the image, those human bodies are identified individually in time series, and the same human bodies are tracked (i.e., the trajectories of human bodies moving are tracked from image to image). Furthermore, if an area has been set in the image, the time for which the human body stays in that area is measured. The result of this measurement is output as a file or the like along with time information. At this time, detection information, tracking information, setting information, and the like may be output as well. One or more of the detection information, information identifying the same human body between frames, the setting information, and measurement results may be displayed in the display unit 125.

A method for setting a determination area within an image will be described next with reference to FIG. 3. In the present embodiment, the image processing system 10 is applied at a location where customers are helped, such as a reception desk, a customer service counter, or a cash register. Images of the people lined up at the reception desk are shot and the times required to handle those people are measured. Thus in the present embodiment, determination areas are set for each individual reception area. For example, in the present embodiment, one of the goals is to measure, as precisely as possible, the amount of time it takes to handle each customer being helped as a reception area 304, indicated in FIG. 3. The determination area is set to an area facing the reception area 304, as indicated by a determination area 301. The same applies when measuring the amount of time it takes to handle each person being helped at a reception area 305 and a reception area 306. The determination areas are set, in order, to areas facing the respective reception areas, as indicated by a determination area 302 and a determination area 303.

Figure 3:
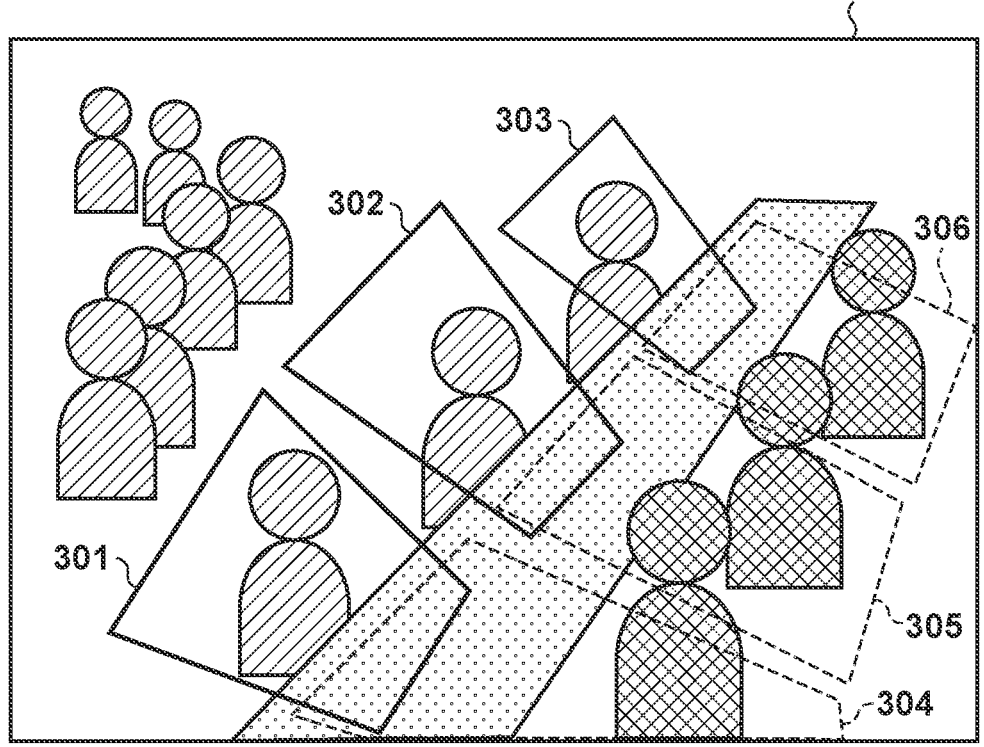
FIG. 3 is a diagram illustrating a method for setting determination areas according to an exemplary embodiment.

In FIG. 3, the plurality of determination areas set within the image are set so as to be adjacent to each other, as indicated by the determination areas 301 to 303. In this case, it is conceivable that a human body detected within a given determination area exits the area or enters into another adjacent area in the process of moving within his or her own determination area. Even in such a case, each person corresponding to a detected human body is positioned in front of the reception area where he or she is being helped, and is not being helped at the reception area corresponding to the adjacent area he or she slipped into. Thus even if a human body is temporarily detected in a different area or has exited the area he or she originally belongs to, that time can be considered as being included in the time he or she was being helped in the original area. The following embodiment will describe a technique in which even if a human body is detected outside of a specific area, that time can be measured as time spent in that specific area.

First, the flow of the overall processing by the image processing system 10 will be described with reference to the flowchart in FIG. 4. This processing is realized by the image processing apparatus 120 reading out a program from the auxiliary storage unit 123 of the image processing apparatus 120 into the main storage unit 122, and the CPU 121 then executing that program.

The image processing apparatus 120 holds information such as the stay time in the auxiliary storage unit 123. The information held includes identification information for identifying the detected human body, and the stay time, the stay start time, and the stay end time for each determination area. Together, this information will be called a "stay-unit". The information of the stay-unit held in the auxiliary storage unit 123 is used to measure the stay time of the detected human body in a determination area. The sequence of this processing will be described in detail below.

In step S401, the area setting unit 212 sets a determination area, for which the stay time is to be measured, in the image to be processed, which has been obtained by shooting a monitored zone. Any desired number of determination areas, i.e., one or more, can be set. Position information of each determination area set in the image is held in the auxiliary storage unit 123. Next, in step S402, the image obtaining unit 202 obtains the image to be processed. The image obtaining unit 202 obtains the image from the image capturing device 110 through the communication unit 201, or obtains an image stored in the auxiliary storage unit 123. If the image to be processed is a frame image from a moving image, information of the shooting time is associated with each frame image. The information of the shooting time can be used as the time information as which the human body was detected in the image to be processed. Next, in step S403, the human body detecting unit 203 detects a human body by analyzing the obtained image to be processed.

Then, in step S404, the human body tracking unit 204 specifies the same human body between images consecutive with respect to time on the basis of the position information of the detected human body, which is stored in the auxiliary storage unit 123. Identification information for identifying the same human body is added to the specified human body and held in the auxiliary storage unit 123. The same identification information is added to the same human body, and the position information of the human body in frame images that are sequential with respect to time is associated with that identification information. This makes it possible to track the movement of the same human body from image to image.

Next, in step S405, the inside/outside area determination unit 205 makes the inside/outside area determination by obtaining the position information of the detected human body and the position information of the determination area, held in the auxiliary storage unit 123. Here, whether the detected human body is within the determination area or outside the determination area can be determined on the basis of whether or not the position information of the human body is located within the range of the determination area as specified by the position information of the determination area. If there are a plurality of determination areas, which determination area the detected human body belongs to is specified as well. The result of the inside/outside area determination is held in the auxiliary storage unit 123.

Next, in step S406, the stay time measurement unit 206 obtains the time information of each image, the identification information of the human body, and the inside/outside area determination result, which are held in the auxiliary storage unit 123. The stay time is measured on the basis of the obtained information. For example, the time at which a human body was detected in a given determination area is specified on the basis of a capturing time for the image in which the human body was detected. The time until it is determined that the same human body is no longer in the same determination area is then measured, and that time can be taken as the stay time. The start time of the stay time corresponds to the capturing time of the image in which the human body was first detected in the determination area. The end time of the stay time corresponds to the capturing time of the image in which the human body which had been continuously detected in the determination area was last detected. The measured stay time is associated with the identification information for specifying the human body and the information for specifying the area, and is held in the auxiliary storage unit 123.

The information of the stay time, generated per area and human body, will be called a "stay-unit". The stay time measurement unit 206 updates the information of the same stay-unit while the same human body is being continuously detected within the same determination area. For example, the end time of the stay time is updated to the capturing time of the current image, and the stay time is accordingly updated. If the same human body has exited the determination area, a new stay-unit is generated and the information thereof is updated. If the human body has returned to the determination area, a new stay-unit is once again generated and the information of the stay time is updated. As a result, a plurality of stay-units corresponding to the current position are generated when the detected human body moves in and out of the area.

In step S407, the stay-unit adjustment unit 207 compares the stay-units held in the auxiliary storage unit 123, and adjusts the stay-units. For example, for stay-units generated for the same human body, the stay-unit having the longest stay time can be selected and the length of the stay time can be adjusted. On the basis of the stay-unit adjusted by the stay-unit adjustment unit 207, the stay area time determination unit 208 determines the determination area in which the human body stayed and stay time to be used for a totaling process, an output process, and a display process carried out by the output unit 209. The output unit 209 may output the selected stay-unit at an appropriate timing. The display control unit 210 may display information of the stay-unit in addition to the image. Next, in step S408, the image obtaining unit 202 determines whether or not there are any unprocessed images. The process returns to step S402 if there is an unprocessed image. However, if there are no unprocessed images, the process ends.

Figure 4:
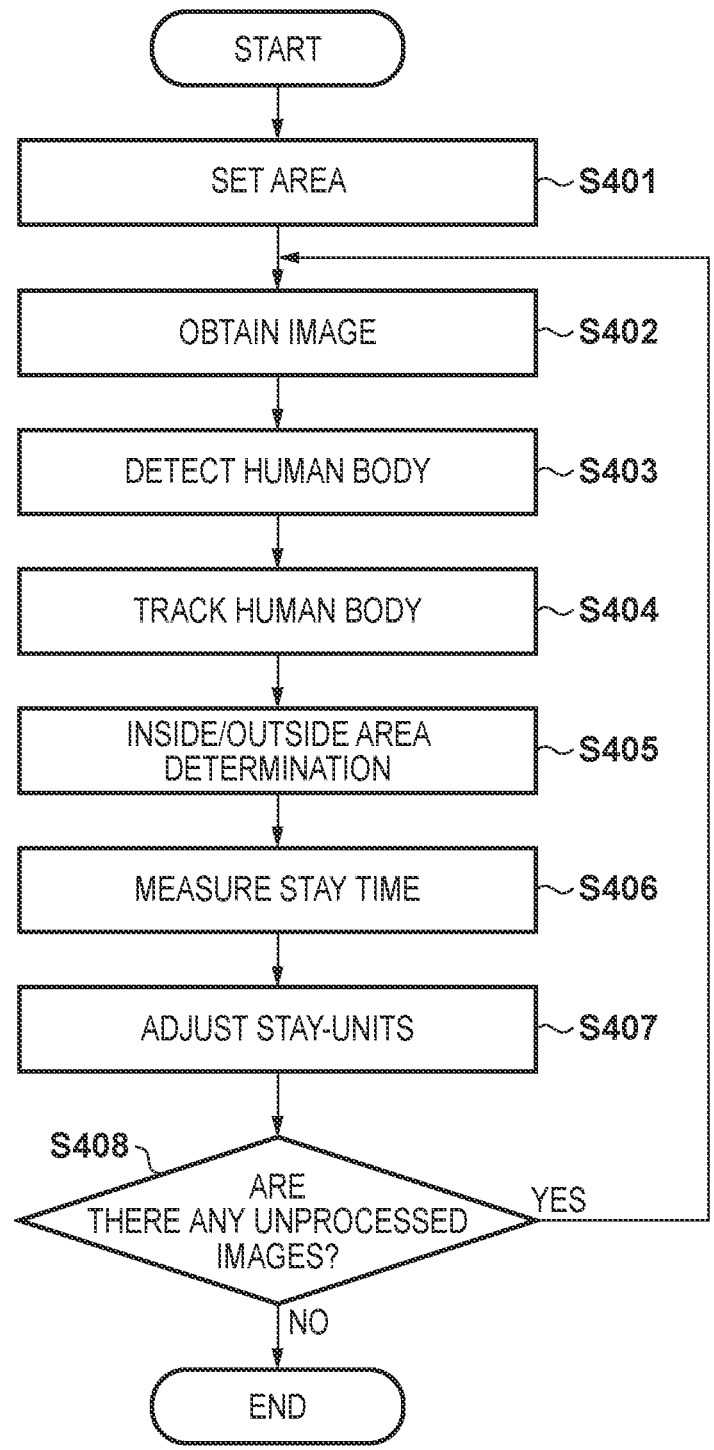
FIG. 4 is a flowchart illustrating an example of processing according to an exemplary embodiment.

Next, an example of the data structure in a table in which measurement results generated on the basis of the processing illustrated in FIG. 4 are registered will be described with reference to FIG. 5. FIG. 5 is a diagram illustrating an example of a table in which measurement results are registered, according to an exemplary embodiment.

The information in a table 500 is held in the auxiliary storage unit 123. The rows in the table 500 indicate stay-units, including the stay time for which the corresponding human body staying in each determination area, for each of the human bodies. A column 501 indicates the stay start time of the human body within that determination area. A column 502 indicates the stay end time of the human body within that determination area. In a column 503, human body identification information for uniquely identifying the human body (called a "tracking ID") is registered. A human body detected in the image to be processed can be uniquely identified throughout a plurality of images using this tracking ID. Columns 504, 505, and 506 indicate stay times for which the human body stays in determination areas. The number of determination areas that can be set need not be limited as long as that number of areas can be processed. Furthermore, although the stay time is expressed in a format where hours, minutes, and seconds are separated by colons, e.g., "00:03:00", the stay time is not limited to this display format. The stay time may be displayed in units of seconds, milliseconds, and so on.

The example in FIG. 5 illustrates a case where the detected human body stays in the same area without leaving that area. In this case, the difference between a stay start time 611 and a stay end time 612 itself is the stay time for the corresponding area. However, if areas are set nearby each other, the same human body may be detected in a plurality of areas.

Accordingly, a stay-unit adjustment process carried out when the same human body has been detected in a plurality of areas will be described with reference to FIGS. 6A to 6D. This process corresponds to the process of step S407 in FIG. 4. In the present embodiment, the stay-unit with the longest cumulative stay time is selected, under the assumption that the human body is being helped at the reception area corresponding to the determination area having the longest cumulative stay time. This will be described in detail below.

Figure 6A:
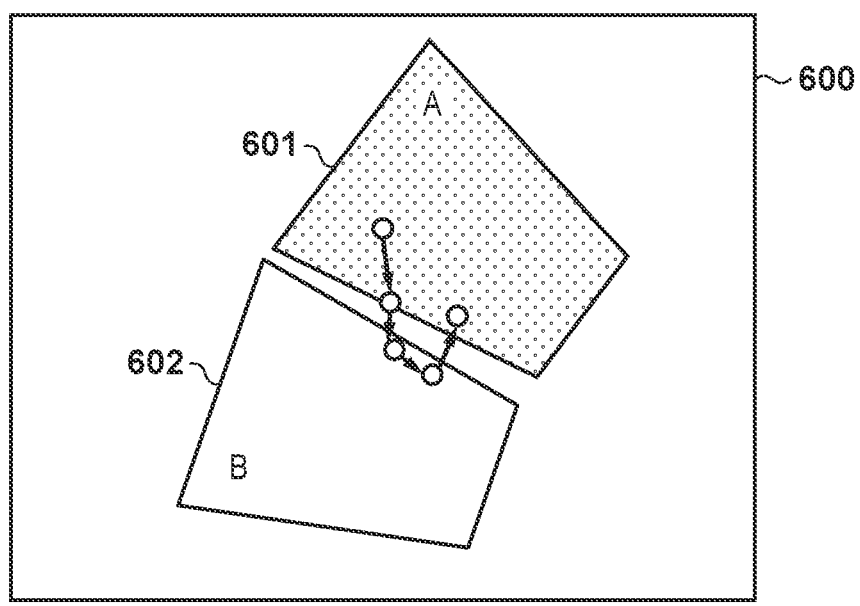
FIG. 6A is a diagram illustrating an example of a human body moving between two determination areas set adjacent to each other, as related to a stay-unit adjustment process according to an exemplary embodiment.

FIG. 6A illustrates an example of a human body moving between two set determination areas that are adjacent to each other. A use case 600 indicates a determination area A601 and a determination area B602, which are set in a given image to be processed, having been cut out. The points in the determination areas indicate positions of the same human body detected throughout a plurality of image frames. The arrows indicate the direction (path and trajectory) of the movement.

FIG. 6B is a table showing an example of the measurement results for the human body indicated in the use case 600. Table 610 shows stay information for a situation where the same human body has been detected in a plurality of areas, as stay-units ordered by time. The information in the table 610 is held in the auxiliary storage unit 123. The information in the table 610 is information from before the stay-unit adjustment process of step S407 is carried out.

Each row in the table 610 indicates a stay-unit including the stay time of the human body in each determination area, and the registered items are basically the same as those shown in FIG. 5. A column 611 indicates the stay start time of the human body within that determination area. A column 612 indicates the stay end time of the human body within that determination area. A column 613 indicates the identification information for identifying the same human body between images that are consecutive with respect to time. Here, this information is a tracking ID. A column 614 indicates the stay time for which the human body stays in the determination area A601. A column 615 indicates the stay time for which the human body stays in the determination area B602.

As shown in the table 610, the detected human body stayed in the determination area A601 for four minutes, from 16:00:00 to 16:04:00, and then stayed in the determination area B602 for ten seconds, from 16:04:05 to 16:04:15. The human body then returned to the determination area A601 and stayed there for two minutes and 20 seconds.

Next, FIG. 6C illustrates a table 620 in which stay times having the same tracking IDs 613 have been extracted from the table 610. Here, if a stay time has been recorded in a plurality of determination areas for the same human body, the total of the stay times in the determination areas is found. The length of time for which the human body does not belong to any of those areas is found as an outside-area cumulative stay time.

A column 621 indicates the identification information of the same human body among the frames. Here, this information is the tracking ID. A column 622 indicates the cumulative stay time for the determination area A601. The stay time for the first time the tracking ID 15 entered a determination area A is 00:04:00. The stay time for the second time the tracking ID 15 entered the determination area A is 00:02:20. As such, the cumulative stay time for the determination area A is 00:06:20. Likewise, a column 623 indicates the cumulative stay time for the determination area B602. The stay time for the tracking ID 15 in a determination area B is 00:00:10. As such, the cumulative stay time for the determination area B602 is 00:00:10.

A column 624 indicates the cumulative stay time for which the human body stayed outside the determination areas, i.e., belonged to neither the determination area A601 nor the determination area B602. The stay times for the tracking ID 15 outside the determination areas are assumed to be a stay time of 00:00:05 during movement from the determination area A to the determination area B, and a stay time of 00:00:05 during movement from the determination area B to the determination area A. Thus the outside-area cumulative stay time is 00:00:10.

In the example indicated by the table 620, comparing the cumulative stay time 622 in the determination area A601 and the cumulative stay time 623 in the determination area B602 for the human body corresponding to the tracking ID 15 shows that the former is longer, and thus the stay-unit for the determination area A601 is selected. The outside-area cumulative stay time 624 is not used for the comparison.

FIG. 6D is a diagram illustrating a table 630 showing a single stay-unit obtained by adjusting the stay time on the basis of the aforementioned selected stay-unit and integrating a plurality of stay-units. The stay start time for the first entry into the determination area A601 and the stay end time for the second exit from the determination area A601 are taken in that order as the stay start time and the stay end time for the tracking ID 15 in the determination area A601. The stay time is found as the difference between the stay start time and the stay end time, and set to (integrated as) a single stay-unit. From the results of the processing based on the table 620, the stay time in the determination area A, which has the longest cumulative stay time, is 00:06:40. The stay time for the determination area B602 is 0. The information from before the stay-unit adjustment process, shown in the table 610, is updated with the stay-unit obtained in this manner.

However, the final result of setting the stay-unit is not limited thereto. The stay-unit from the first entry into the determination area A601 and the stay-unit from the second entry may be held separately rather than being integrated. If the units are held separately, they may be held separately if the second stay time is longer than a predetermined amount of time, and integrated if the second stay time is not longer than the predetermined amount of time. Alternatively, the units may be held separately if the time stayed outside the area between the first and second times is longer than a predetermined amount of time. In this manner, when the same human body has stayed in a plurality of determination areas, the adjustment is carried out on the basis of the stay-unit for the determination area having the longest cumulative stay time. Clarifying the determination area having the longest cumulative stay time makes it easy to carry out the determination for specifying the reception area or the like where the human body was actually helped.

Figure 7:
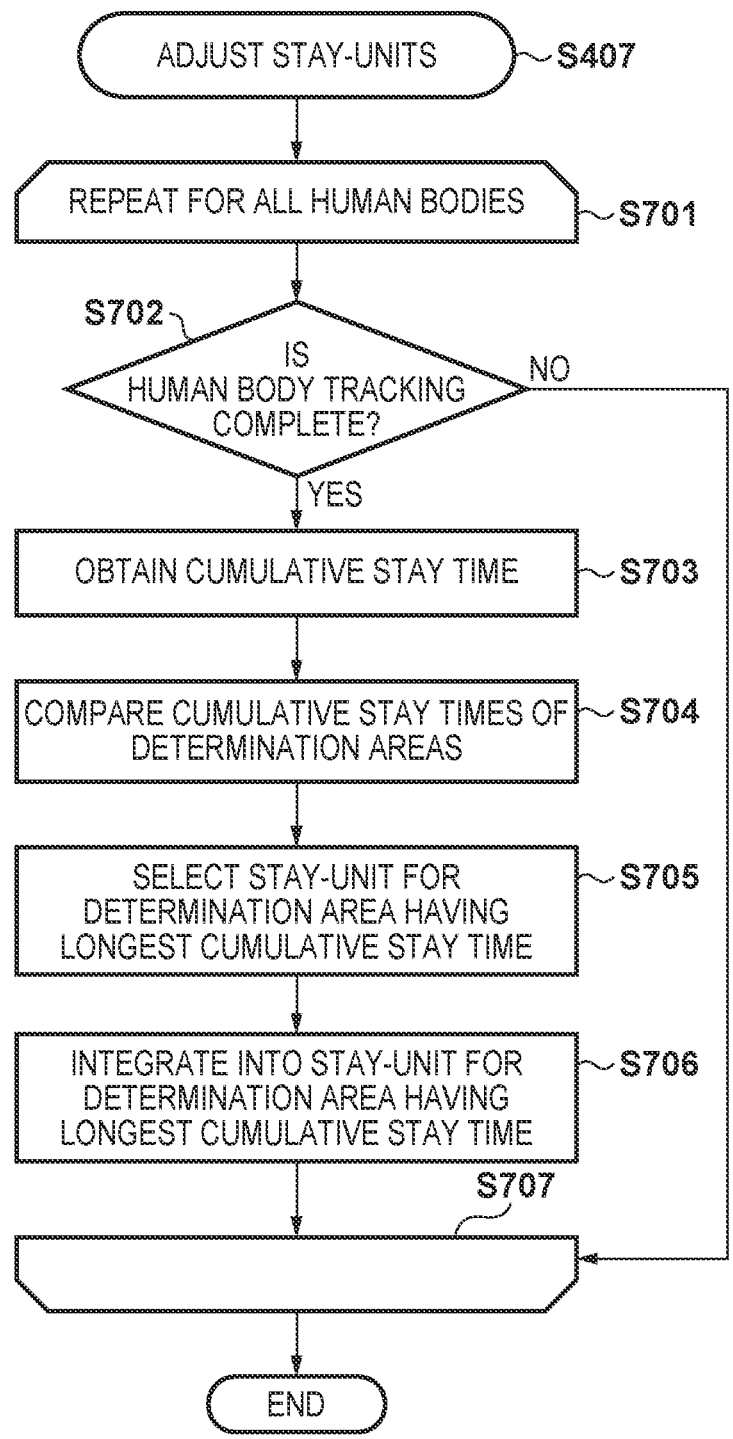
FIG. 7 is a flowchart illustrating an example of a stay-unit adjustment process according to an exemplary embodiment.

The flow of the stay-unit adjustment process will be described next with reference to the flowchart in FIG. 7. The processes of steps S701 to S707 are repeated for all human bodies for which the human body tracking in the previous image to be processed has not ended. These are carried out until the processes of steps S701 to S707 are carried out for all the human bodies.

In step S702, the stay-unit adjustment unit 207 determines whether or not a human body tracking process is complete for the human body to be processed. This determination can be made when the human body for the determination, which had been present in the image to be processed immediately previous, is no longer in the current image to be processed. Specifically, the stay-unit adjustment unit 207 compares the human body tracking information held in the auxiliary storage unit 123 with the human body tracking information in the current image being processed. If the comparison indicates that the human body is present in the human body tracking information that is held but is not present in the current image, it can be determined that the tracking of that human body has ended. The process moves to step S703 when it is determined that the human body tracking has ended, and to step S707 when it is determined that the human body tracking has not ended.

In step S703, the stay-unit adjustment unit 207 obtains the stay-units for the human body being processed, held in the auxiliary storage unit 123. Then, the stay times of the stay-units for the same human body specified on the basis of the tracking ID, in the same determination area, are added together to find the cumulative stay time. Next, in step S704, the stay-unit adjustment unit 207 compares the cumulative stay times of the determination areas, found in step S703. In step S705, the stay-unit adjustment unit 207 selects the stay-unit of the determination area having the longest cumulative stay time. Then, in step S706, the other stay-units are integrated with the stay-unit for the determination area having the longest cumulative stay time, which was selected in step S705. The processing described thus far is repeated for all human bodies detected in the image to be processed.

According to the present embodiment, the time for which a human body stays in a set area can be measured at a location where people are helped, such as a reception desk, a customer service counter, or a cash register, which makes it possible to accurately measure the time it takes to help a human body at the reception desk or the like. Furthermore, in the present embodiment, the cumulative stay time is adjusted and the average of the response times at each reception area can be calculated, which makes it possible to measure the reception area response time per human body in a statistically accurate manner. As a result, work can be improved and made more efficiently, for example by optimizing the distribution of personnel.

The foregoing embodiment describes a case where the processing is carried out on the basis of the length of the cumulative stay time in each determination area. However, the stay-unit adjustment unit 207 may also count the total number of times the same human body is detected in each determination area, and the stay-unit having the highest number of detections within the determination area may be selected, for example.

In the present embodiment, stay-units are held for each determination area and for each human body, and the stay times in the determination areas are compared. The stay-unit having the longest cumulative stay time is selected, and the stay time is then adjusted. As a result, if a detected human body has moved from inside a determination area to outside the determination area, or into another determination area, the time for which the human body was located outside the determination area can be included in the stay time. Additionally, the determination areas associated with the detected person can be narrowed down to a single determination area, which makes it easy to carry out the determination for specifying the reception area or the like where the person was actually helped.

Second Embodiment

A second embodiment will be described next. The present embodiment describes another example of the stay-unit adjustment process, for a situation where a human body temporarily moves to another determination area or moves outside the determination area. The first embodiment describes an example in which the time the human body was in another determination area is integrated with the stay time for the determination area having the longest cumulative stay time. As opposed to this, the present embodiment describes a stay-unit adjustment process for a situation where the human body has returned to the original determination area from a different determination area within a set amount of time. The "set amount of time" assumes a relatively short amount of time. The measurement handles such a situation as if the human body did not enter a different determination area. This will be described in detail below.

The system configuration and the hardware and software configurations of the image processing apparatus 120 according to the present embodiment are the same as those described in the first embodiment with reference to FIGS. 1A, 1B, and 2, and therefore will not be described here.

Figures 8A, 8B, 8C:
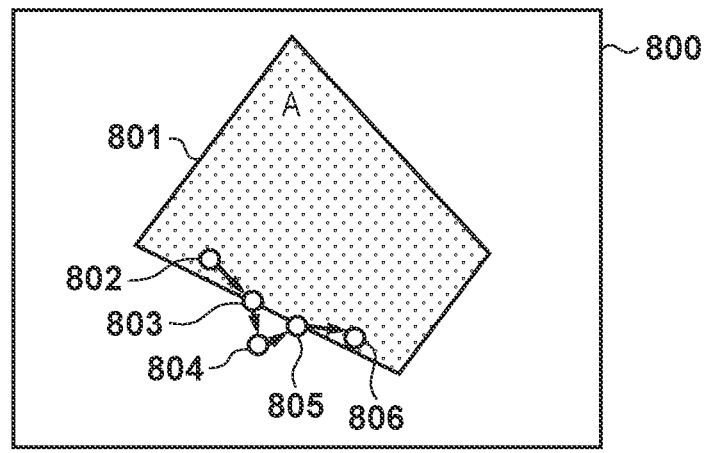
FIG. 8A is a diagram illustrating an example of a human body moving in and out of a single determination area, as related to a stay-unit adjustment process according to an exemplary embodiment.
FIG. 8B is a diagram illustrating an example of a table 810 showing an example of detection results obtained for a human body in a use case 800, according to an exemplary embodiment.
FIG. 8C is a diagram illustrating a stay-unit obtained by integrating two stay-units 811 and 813 when a human body is staying in a determination area A801, according to an exemplary embodiment.

A stay-unit adjustment process according to the present embodiment, carried out when the same human body has been detected in a plurality of areas will be described with reference to FIGS. 8A to 8C. FIG. 8A illustrates an example of a human body moving out of, and then into, a single determination area. A use case 800 indicates a determination area A801 in a given image to be processed, having been cut out. The circular points in the determination area indicate positions of the same human body detected throughout a plurality of image frames. The arrows indicate the direction (path and trajectory) of the movement.

A point 802 indicates the position at which a human body is detected in a frame 001-Frame. Points 803 to 806 indicate the positions at which the same human body is detected in frames 002-Frame to 005-Frame, respectively. Time passes in the order of the frame numbers, as indicated by the arrows in the drawing. In this case, the human body is outside the determination area A801 at point 804. The human body is inside the determination area A801 at the other points.

FIG. 8B is a table showing an example of the detection results for the human body indicated in the use case 800. Table 810 shows stay information for a situation where the same human body has temporarily exited the determination area and then returned, as stay-units ordered by time. The information in the table 810 is held in the auxiliary storage unit 123. The information in the table 810 is information from before the stay-unit adjustment process is carried out.

The rows in the table 810 indicate stay-units, including the stay time for each human body in each determination area. A column 811 indicates the stay-unit for which the human body having the tracking ID 15 stays in the determination area A801. A column 812 indicates the stay-unit for which the human body having the tracking ID 15 is outside the determination area. A column 813 indicates the stay-unit for which the human body having the tracking ID 15 stays in the determination area A801. In this case, the human body has only stayed outside the determination area for ten seconds, i.e., 00:00:10. In the present embodiment, a case where a human body has temporarily moved outside a determination area and into a different determination area, or the stay time for which the human body is temporarily outside the determination area is less than or equal to a threshold, is treated as if the human body did not temporarily exit the determination area. Here, if the threshold is set to, for example, 20 seconds or less, and the time for which the human body exited the determination area is shorter than the threshold, that time is included in the stay time for the determination area A801. At this time, a stay-unit 812 where the human body temporarily exited the determination area is deleted, and stay-units 811 and 813 from when the human body was in the determination area A801 are integrated.

A table 820 in FIG. 8C shows a stay-unit obtained by integrating the two stay-units 811 and 813 when the human body is the determination area A801. In the table 820, the stay start time 821 is the stay start time in row 811. The stay end time 822 is the stay end time in row 813. The stay time in the determination area A801 is the difference between the stay start time 821 and the stay end time 822. Here, the difference between 16:00:00 and 16:05:00, i.e., 00:05:00, is the stay time for which the human body having the tracking ID 15 has stayed in the determination area A801. In other words, the human body is treated as if it did not exit the determination area. As a result, a single determination area where it is thought that the human body was helped can be determined with ease.

Furthermore, even if the human body has temporarily moved to a different determination area or has exited the determination area, that time is added to the stay time for the determination area where the human body was originally staying. Adjusting the stay time so that the human body has continuously stayed in a single determination area makes it easy to carry out the determination for specifying the reception area or the like where the human body was actually helped. The time it actually took to help the human body can also be determined accurately.

Figure 9:
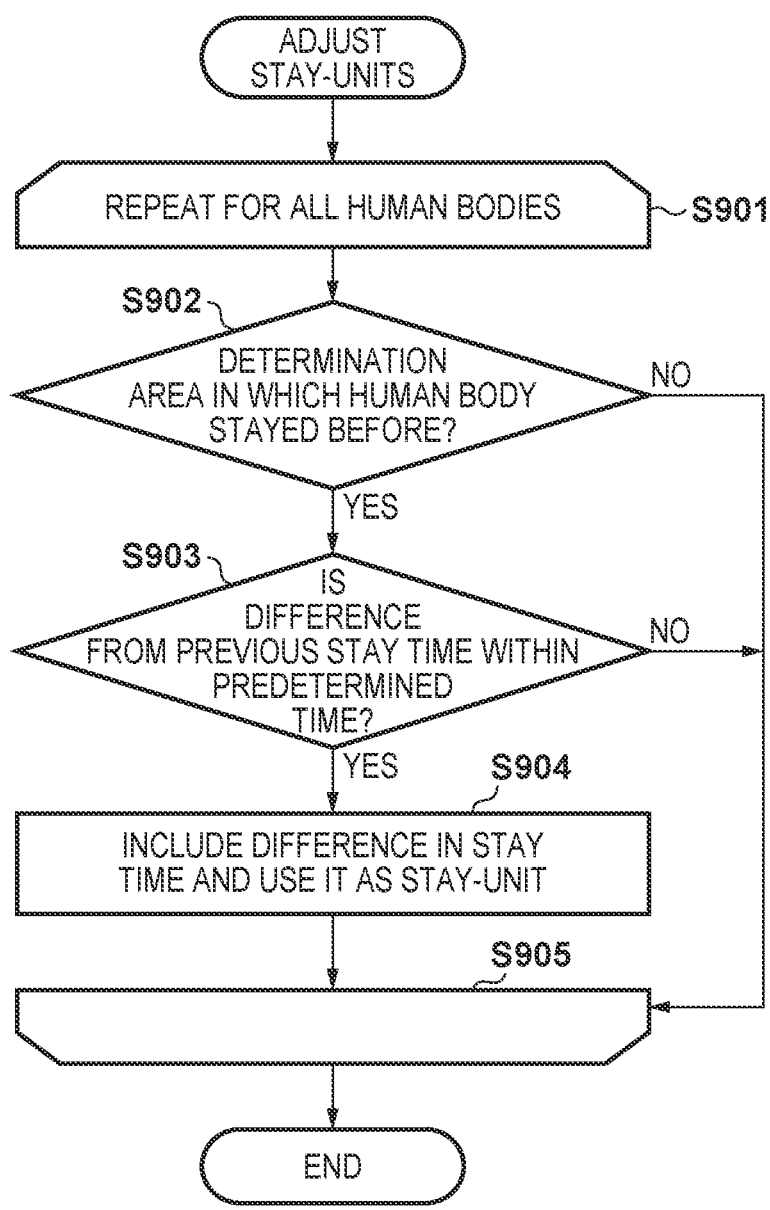
FIG. 9 is a flowchart illustrating an example of a stay-unit adjustment process according to an exemplary embodiment.

The flow of the stay-unit adjustment process according to the present embodiment will be described next with reference to the flowchart in FIG. 9. The processes of steps S901 to S905 are repeated for the human bodies for which the human body tracking in the previous image to be processed has not ended. These are carried out until the processes of steps S901 to S905 are carried out for all the human bodies.

In step S902, the stay-unit adjustment unit 207 determines whether or not the determination area in which the human body to be processed is staying in the current image to be processed is the same as the determination area the human body was staying in before. This determination is a process of determining whether or not the human body to be processed has exited a determination area he or she was staying in previously and then re-entered that determination area. Specifically, the stay-unit of the human body to be processed, which is held in the auxiliary storage unit 123, is obtained and compared with the determination area in which the human body is currently staying. If the determination area is determined to have been stayed and even just once before, the process moves to step S903, and if not, the process moves to step S905.

In step S903, the stay-unit adjustment unit 207 finds the difference between the stay start time of the stay-unit where the human body is currently staying in the determination area, and the stay end time of the stay-unit where the human body stayed in the same determination area. The difference found here indicates the time for which the human body temporarily entered a different determination area or exited the determination area. Additionally, this difference can indicate the amount of time for which the human body stayed in both the different determination area and outside the determination area. The difference is compared with a threshold, and if the difference is less than or equal to the threshold, the process moves to step S904. If the difference is greater than the threshold, the process moves to step S905. In step S904, processing is carried out so as to include the calculated difference in the stay time for the current determination area. This can be taken as indicating that the human body did not temporarily enter a different area. Specifically, stay-units in which the human body stayed in a different area are deleted, and the stay-units from when the human body stayed in the original determination area are integrated. The stay-unit resulting from the integration can be called an "integrated unit". The stay start time of the stay-unit in which the human body stayed first can be taken as the stay start time of the integrated stay-unit. Likewise, the stay end time of the stay-unit in which the human body stayed last can be taken as the stay end time of the integrated stay-unit. The stay time of the integrated stay-unit corresponds to the difference between the stay start time of the integrated stay-unit and the stay end time of the integrated stay-unit. The processing described thus far is repeated for all human bodies detected in the image to be processed.

As described thus far, in the present embodiment, the stay-unit is adjusted in a situation where a human body temporarily moves to a different determination area or moves outside the determination area. This adjustment makes it possible to set the stay time as if the human body never entered a different determination area. If the amount of time the human body was temporarily in a difference area is less than or equal to a threshold, that stay time is treated as if the human body was in the original determination area, and is integrated. Deleting the unnecessary information of temporary exits makes it easy to set a single determination area. In other words, the determination for specifying the reception area or the like where the person was actually helped is easier. Additionally, the difference between the stay start time from when the human body first stayed in the same determination area and the stay end time from when the human body last stayed in the determination area is found and integrated as the stay time. As a result, the time for which the person was actually helped can be determined accurately.

Third Embodiment

A third embodiment will be described next. When an image of a monitored zone is captured, there are situations where the human bodies detected in the determination area include not only a human body staying in that area, but also a human body passing through that area. Such a human body should be excluded from the stay time measurement. As such, the present embodiment describes a stay-unit adjustment process for a human body passing through a different determination area.

In the present embodiment, when a human body passes through the determination area, the movement speed of the human body is found and compared with a threshold speed. If the movement speed is less than or equal to the threshold, it is determined that the human body is being helped in that determination area. On the other hand, if the movement speed is higher than the threshold, the human body is treated as having been added to the determination area as opposed to being helped in the determination area, and is excluded from the processing. This will be described in detail below.

The system configuration and the hardware and software configurations of the image processing apparatus 120 according to the present embodiment are the same as those described in the first embodiment with reference to FIGS. 1A, 1B, and 2, and therefore will not be described here.

Figure 10:
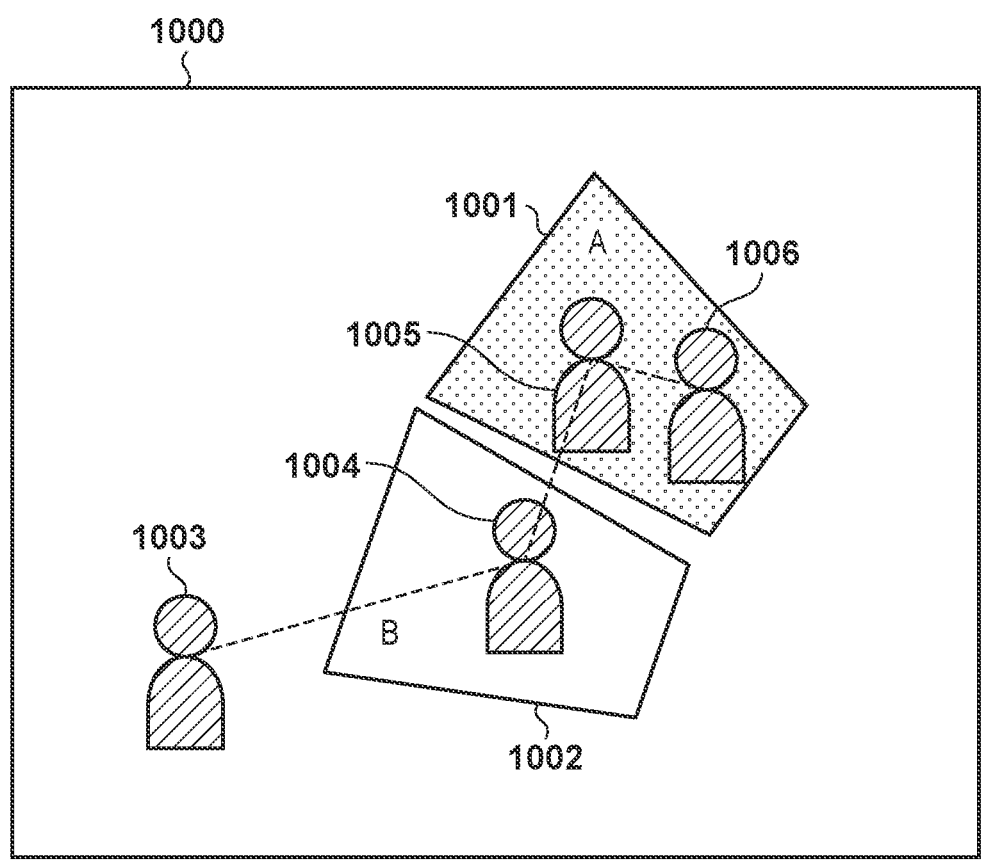
FIG. 10 is a diagram illustrating yet another example of a stay-unit adjustment process according to an exemplary embodiment.

The stay-unit adjustment process according to the present embodiment will be described next with reference to FIG. 10. FIG. 10 illustrates an example of a human body moving in and out of two set determination areas that are adjacent to each other. A use case 1000 indicates a determination area A1001 and a determination area B1002 in a given image to be processed, having been cut out. The graphics indicating people in the determination area indicate positions of the same human body detected throughout a plurality of image frames (001-Frame to 004-Frame). The dotted lines indicate the path (trajectory) of the movement.

A person graphic 1003 indicates the position of a person detected in a frame 001-Frame. Likewise, person graphics 1004 to 1006 indicate the positions at which the same person is detected in frames 002-Frame to 004-Frame, respectively. The increase in the frame numbers corresponds to the passage of time.

In the example illustrated in FIG. 10, the position of the person 1003 detected in the frame 001-Frame is outside the determination area. Thereafter, the same person is detected at the position indicated by a person graphic 1004 in the determination area B1002 in frame 002-Frame, and is furthermore detected at the positions indicated by person graphics 1005 and 1006 in the determination area A1001 in frames 003-Frame and 004-Frame. At this time, the time required to move from the position of the person graphic 1003 to the person graphic 1004 is taken as a time 1. The time required to move from the position of the person graphic 1004 to the person graphic 1005 is taken as a time 2. Furthermore, the time required to move from the position of the person graphic 1005 to the person graphic 1006 is taken as a time 3.

Here, for the sake of simplicity, the respective movement times, i.e., time 1, time 2, and time 3, are assumed to be equal. The distance moved during time 1 is the longest, the distance moved during time 2 is the second-longest, and the distance moved during time 3 is the shortest. Accordingly, the movement speed is highest during time 1, second-highest during time 2, and lowest during time 3.

For example, if the movement speed during time 3 is slower than the threshold and the other movement speeds are higher than the threshold, the person can be estimated to be moving toward the determination area A1001. In this case, it makes sense to measure the time for which the person stayed in the determination area A1001 as the stay time, and there is no need to measure the times at the positions indicated by the person graphics 1003 and 1004. The present embodiment will describe a method for efficiently measuring the stay time in the determination area A1001, on the basis of the movement speeds.

Figure 11:
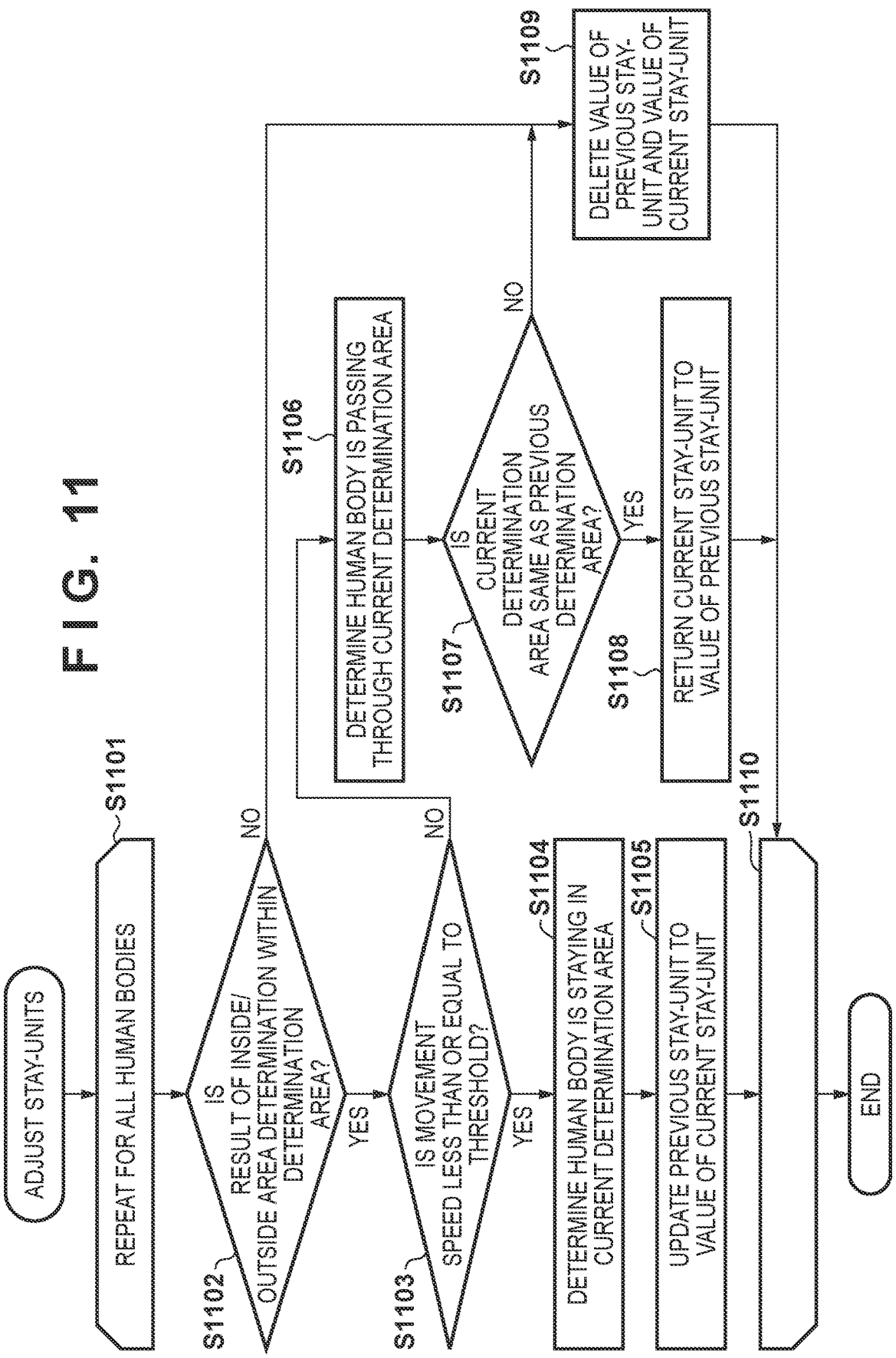
FIG. 11 is a flowchart illustrating yet another example of a stay-unit adjustment process according to an exemplary embodiment.

Here, the flow of the stay-unit adjustment process according to the present embodiment will be described with reference to the flowchart in FIG. 11. The processes of steps S1101 to S1110 are repeated, in time series, for each of the human bodies for which the human body tracking in the previous image to be processed has not ended. This is carried out until the processes of steps S1101 to S1110 have been carried out for all the human bodies.

In step S1102, the stay-unit adjustment unit 207 confirms whether the result of the inside/outside area determination for the human body being processed, which is held in the auxiliary storage unit 123, is within the determination area. As will be described later, the result of the inside/outside area determination is already held in the auxiliary storage unit 123, from when the inside/outside area determination process was carried out in step S405 of FIG. 4. If the human body is within the determination area, the process moves to step S1103, whereas if the human body is outside the determination area, the process moves to step S1109.

In step S1103, the stay-unit adjustment unit 207 determines whether the movement speed of the human body is less than or equal to the speed threshold, on the basis of the result of the human body tracking for the human body being processed, which is held in the auxiliary storage unit 123. The movement speed of the human body has already been held in the auxiliary storage unit 123, when the human body tracking process was carried out in step S404. If the movement speed of the human body is less than or equal to the threshold, the process moves to step S1104, whereas if the movement speed of the human body is greater than (faster than) the threshold, the process moves to step S1106. In step S1104, the movement speed is less than or equal to the threshold, and thus the stay-unit adjustment unit 207 determines that the human body being processed is staying in the current determination area. In step S1105, the stay-unit adjustment unit 207 updates the stay-unit, which has been generated or updated on the basis of the previous image to be processed of the human body being processed, to a current stay-unit that reflects the current measurement result. If there is no previous stay-unit, a new one is prepared.

In step S1106, the movement speed is higher than the threshold, and thus the stay-unit adjustment unit 207 determines that the human body being processed is passing through the current determination area. Next, in step S1107, it is confirmed whether the current determination area is the same as the previous determination area. If the determination area is the same as the previous determination area, the process moves to step S1108, whereas if the determination area is a different determination area, the process moves to step S1109. In step S1108, the current stay-unit, in which the current measurement result of the human body being processed is reflected, is returned to the value of the previous stay-unit. As a result, the state is the same as if the stay time was not measured. In step S1109, the values of the previous stay-unit and the current stay-unit for the human body being processed are both deleted. As a result, the stay time in the determination area is not measured for the human body who is just passing through the determination area.

Partial changes to the flowchart of FIG. 4 corresponding to the present embodiment will be described next. In the following, only the processes of the present embodiment that are different from those in the first embodiment will be described. Other parts have already been described in the first embodiment and will therefore be omitted here.

In step S404, a speed determination process is carried out in addition to the processing described in the first embodiment. In the speed determination process, the movement speed of the human body is determined on the basis of the position information of the human body found by the human body tracking unit 204 in the current image to be processed and the image to be processed immediately previous, and the time information of each image to be processed. The determined movement speed is held in the auxiliary storage unit 123. Next, in step S405, the inside/outside area determination unit 205 carries out the inside/outside area determination on the basis of the result of comparing the movement speed of the human body with the threshold, in addition to the process described in the first embodiment. Specifically, if the movement speed is less than or equal to the threshold, the movement speed is treated as being slow. The human body is determined to be staying within the determination area in question, and is determined to be inside the determination area. However, if the movement speed of the human body is not less than or equal to the threshold, the movement speed is high. The human body is determined to have passed through the determination area in question, and is determined to be outside the determination area.

Next, in step S406, the stay time measurement unit 206 obtains the time information based on the capturing time of each image, the identification information of the human body, and the inside/outside area determination result, which are held in the auxiliary storage unit 123. The stay time measurement unit 206 generates the current stay-unit by updating the previous stay-unit through the same process as that described in the first embodiment. At this time, the generated current stay-unit is not written over the previous stay-unit, but is instead stored separately in the auxiliary storage unit 123. The previous stay-unit and the current stay-unit that have been stored are updated, deleted, or the like according to the flow of the processing of FIG. 11.

In this manner, when the movement speed of the human body is less than or equal to the threshold, it is determined that the human body is staying within the determination area in question, and the stay time is measured. However, if the movement speed of the human body is not less than or equal to the threshold, the human body is determined to have passed through the determination area in question, and the stay time in the determination area in question is not measured.

Although the foregoing described determining whether or not the human body has passed through the determination area on the basis of the movement speed of the human body, the determination need not depend on the movement speed. For example, the distance over which the human body has moved between frames may be found. Then, if the movement distance is less than or equal to a threshold, the human body may be determined to be staying in that area, whereas if the movement distance is greater than the threshold, the human body may be determined to be passing through.

According to the present embodiment as described thus far, the stay-unit can be adjusted when the human body is passing through a determination area. Specifically, a movement speed threshold is provided, and if the speed is less than or equal to the threshold, the human body is treated as being in the determination area, and the stay time is measured. If the speed is higher than the threshold, the human body is determined to be passing through and therefore outside the determination area, and the time is therefore treated as if the human body was outside the determination area. Thus when the human body has simply passed through a determination area, that human body's stay time can be effectively prevented from being measured. Specifying the reception area or the like where the person was actually helped is easier as a result.

Although exemplary embodiments have been described above, the embodiments are not intended to be limited to the descriptions therein, and many variations and alterations are possible within the scope thereof.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-228322 filed on Dec. 5, 2018 which is hereby incorporated by reference herein in its entirety.

What is claimed is:

1. An information processing apparatus comprising a processor executing instructions that, when executed by the processor, cause the processor to function as:
   a setting unit configured to set a first area for detecting an object in a moving image and a second area which is adjacent to the first area;
   a detection unit configured to detect an object in the moving image;
   a determination unit configured to determine a stay time, on an area-by-area basis, for which an object has stayed on the basis of a result of detecting the object in the moving image;
   a specifying unit configured to, when the object has been detected by the detection unit in the first area and the second area, specify an area in which the stay time of the object is the longest, among the first area and the second area;
   an adjusting unit configured to, when the first area is specified as the area in which the stay time of the object is the longest,
   perform an addition calculation of the stay time of the object in the second area determined by the determination unit to the stay time of the object in the first area,
   change the stay time of the object in the first area to a total value obtained in the addition calculation, and
   change the stay time of the object in the second area determined by the determination unit to zero; and
   an output unit configured to output the stay time changed by the adjusting unit for each area set by the setting.

2. The information processing apparatus according to claim 1, wherein the instructions, when executed by the processor, further cause the processor to function as:
an obtainment unit configured to obtain the moving image from an image capturing device including an image capturing unit configured to capture the moving image.

3. The information processing apparatus according to claim 1, wherein when a time period is satisfied with a predetermined condition, the stay time of the object within the first area is a time period between a time when the object first enters the first area and a time when the object last leaves the first area.

4. The information processing apparatus according to claim 1, wherein, the determination unit is further configured to determine a cumulative stay time of the object staying in-between the first area and the second area,
during which the object stays other than the first area and the second area, and when the first area is specified by the specifying unit as the area in which the stay time of the object is the longest,
the adjusting unit is further configured to: perform another addition calculation of the stay time of the object in the second area determined by the determination unit and the cumulative stay time of the object staying other than the first area and the second area, to the stay time of the object in the first area, change the stay time of the first area to a total value of the another addition calculation, and change the stay time of the object in the second area determined by the determination unit to zero.

5. An information processing method comprising:
setting a first area for detecting an object in a moving image and a second area which is adjacent to the first area;
detecting an object in the moving image;
determining a stay time, on an area-by-area basis, for which an object has stayed on the basis of a result of detecting the object in the moving image;
specifying, when the object has been detected in the detecting in the first area and the second area, an area in which the stay time of the object is the longest, among the first area and the second area;
when the first area is specified as the area in which the stay time of the object is the longest,
performing an addition calculation of the stay time of the object in the second area determined in the determining to the stay time of the object in the first area,
changing the stay time of the object in the first area to a total value obtained in the addition calculation, and
changing the stay time of the object in the second area determined in the determining to zero; and
outputting the stay time changed in the changing for each area set in the setting.

6. A non-transitory computer-readable storage medium that stores instructions that can be read by a computer, the instructions, when executed, causing the computer to perform a process comprising:
setting a first area for detecting an object in a moving image and a second area which is adjacent to the first area;
detecting an object in the moving image;
determining a stay time, on an area-by-area basis, for which an object has stayed on the basis of a result of detecting the object in the moving image;
specifying, when the object has been detected in the detecting in the first area and the second area, an area the in which the stay time of the object is the longest, among the first area and the second area;
when the first area is specified as the area in which the stay time of the object is the longest,
performing an addition calculation of the stay time of the object in the second area determined in the determining to the stay time of the object in the first area,
changing the stay time of the object in the first area to a total value obtained in the addition calculation, and
changing the stay time of the object in the second area determined in the determining to zero; and
outputting the stay time changed in the changing for each area set in the setting.

* * * * *